US009921583B2

(12) United States Patent
Chan et al.

(10) Patent No.: US 9,921,583 B2
(45) Date of Patent: Mar. 20, 2018

(54) PACKAGE MANAGEMENT SYSTEM FOR ROBOTIC VEHICLES

(71) Applicant: Elwha LLC, Bellevue, WA (US)

(72) Inventors: Alistair K. Chan, Bainbridge Island, WA (US); Jesse R. Cheatham, III, Seattle, WA (US); Hon Wah Chin, Palo Alto, CA (US); William David Duncan, Mill Creek, WA (US); Roderick A. Hyde, Redmond, WA (US); Lowell L. Wood, Jr., Bellevue, WA (US)

(73) Assignee: Elwha LLC

( * ) Notice: Subject to any disclaimer, the term of this patent is extended or adjusted under 35 U.S.C. 154(b) by 43 days.

(21) Appl. No.: 15/046,710

(22) Filed: Feb. 18, 2016

(65) Prior Publication Data

US 2017/0242438 A1 Aug. 24, 2017

(51) Int. Cl.
*G05D 1/02* (2006.01)
*G06K 9/00* (2006.01)
(Continued)

(52) U.S. Cl.
CPC ....... *G05D 1/0212* (2013.01); *G01C 21/3407* (2013.01); *G06K 9/00288* (2013.01); *G08B 13/2491* (2013.01)

(58) Field of Classification Search
CPC ............. G05D 1/0212; G01C 21/3407; G06K 9/00288; G08B 13/2491; G05B 19/418; G05B 19/41815; G05B 19/41865
(Continued)

(56) References Cited

U.S. PATENT DOCUMENTS 3,628,632 A * 12/1971 Lambert ................. A47F 9/043
186/66
5,933,814 A * 8/1999 Rosenberg .............. A47F 10/02
705/27.1
(Continued)

FOREIGN PATENT DOCUMENTS

CN 102289556 A 12/2011
CN 104085437 A 10/2014
JP 2006155039 A 6/2006

OTHER PUBLICATIONS p142-kulyukin.pdf (Vladimir A. Kulyukin, Chaitanya Gharpure, Ergonomics-for-One in a Robotic Shopping Cart for the Blind, 2006, pp. 142-149).*

(Continued)

*Primary Examiner* — Bao Long T Nguyen

(57) ABSTRACT

Described embodiments include a system, method, and apparatus. A system includes package management system for operating a robotic vehicle configured to transport consumer items selected by a human shopper from a consumer shopping environment and placed in the robotic vehicle. The package management system includes circuitry for receiving data indicative of a transportation departure point accommodating a transfer of a consumer item from the robotic vehicle to a conveyance configured to transport the consumer item away from the consumer shopping environment. The package management system includes circuitry for routing the robotic vehicle to the departure point. In an embodiment, the package management system includes circuitry for managing a transfer of a consumer item acquired by the individual human shopper in the consumer shopping environment from the robotic vehicle to the conveyance at the departure point.

30 Claims, 12 Drawing Sheets

(51) Int. Cl.
*G08B 13/24* (2006.01)
*G01C 21/34* (2006.01)

(58) Field of Classification Search
USPC ....... 700/257, 213, 214, 216, 218, 228, 229, 700/230, 250; 901/1
See application file for complete search history.

(56) References Cited

U.S. PATENT DOCUMENTS

| | | | |
|---|---|---|---|
| 6,323,753 B2 | 11/2001 | Begum | |
| 6,725,206 B1* | 4/2004 | Coveley | A47F 9/048 177/17 |
| 7,147,154 B2 | 12/2006 | Myers et al. | |
| 8,307,061 B1 | 11/2012 | Hickman et al. | |
| 8,321,364 B1 | 11/2012 | Gharpure et al. | |
| 8,639,644 B1 | 1/2014 | Hickman et al. | |
| 8,950,671 B2 | 2/2015 | Chan et al. | |
| 9,008,829 B2* | 4/2015 | Worsley | G05D 1/0287 700/213 |
| 9,061,102 B2 | 6/2015 | Levien et al. | |
| 9,205,754 B2 | 12/2015 | Hyde et al. | |
| 9,205,886 B1 | 12/2015 | Hickman et al. | |
| 9,230,387 B2* | 1/2016 | Stiernagle | G07F 9/023 |
| 9,520,012 B2* | 12/2016 | Stiernagle | G07F 9/023 |
| 2002/0165638 A1* | 11/2002 | Bancroft | A47F 10/00 700/213 |
| 2004/0217166 A1 | 11/2004 | Myers et al. | |
| 2006/0242027 A1 | 10/2006 | Falic | |
| 2008/0294287 A1* | 11/2008 | Kawano | B25J 9/1664 700/252 |
| 2010/0136918 A1 | 6/2010 | Bonner et al. | |
| 2011/0018707 A1 | 1/2011 | Dobson et al. | |
| 2013/0073405 A1 | 3/2013 | Ariyibi | |
| 2013/0110281 A1* | 5/2013 | Jones | G06Q 10/08 700/228 |
| 2013/0187755 A1 | 7/2013 | Rogers et al. | |
| 2013/0204430 A1* | 8/2013 | Davey | G06F 19/3456 700/216 |
| 2014/0052571 A1 | 2/2014 | Raman, Sr. | |
| 2014/0081445 A1* | 3/2014 | Villamar | G06Q 10/087 700/216 |
| 2015/0032252 A1* | 1/2015 | Galluzzo | B25J 5/007 700/218 |
| 2015/0073589 A1* | 3/2015 | Khodl | B25J 5/007 700/218 |
| 2015/0094879 A1* | 4/2015 | Pari | G05D 1/0276 701/2 |
| 2015/0161665 A1 | 6/2015 | Grimes et al. | |
| 2015/0205298 A1 | 7/2015 | Stoschek et al. | |

OTHER PUBLICATIONS

PCT International Search Report; International App. No. PCT/US2017/018333; Jul. 11, 2017; pp. 1-3.

* cited by examiner

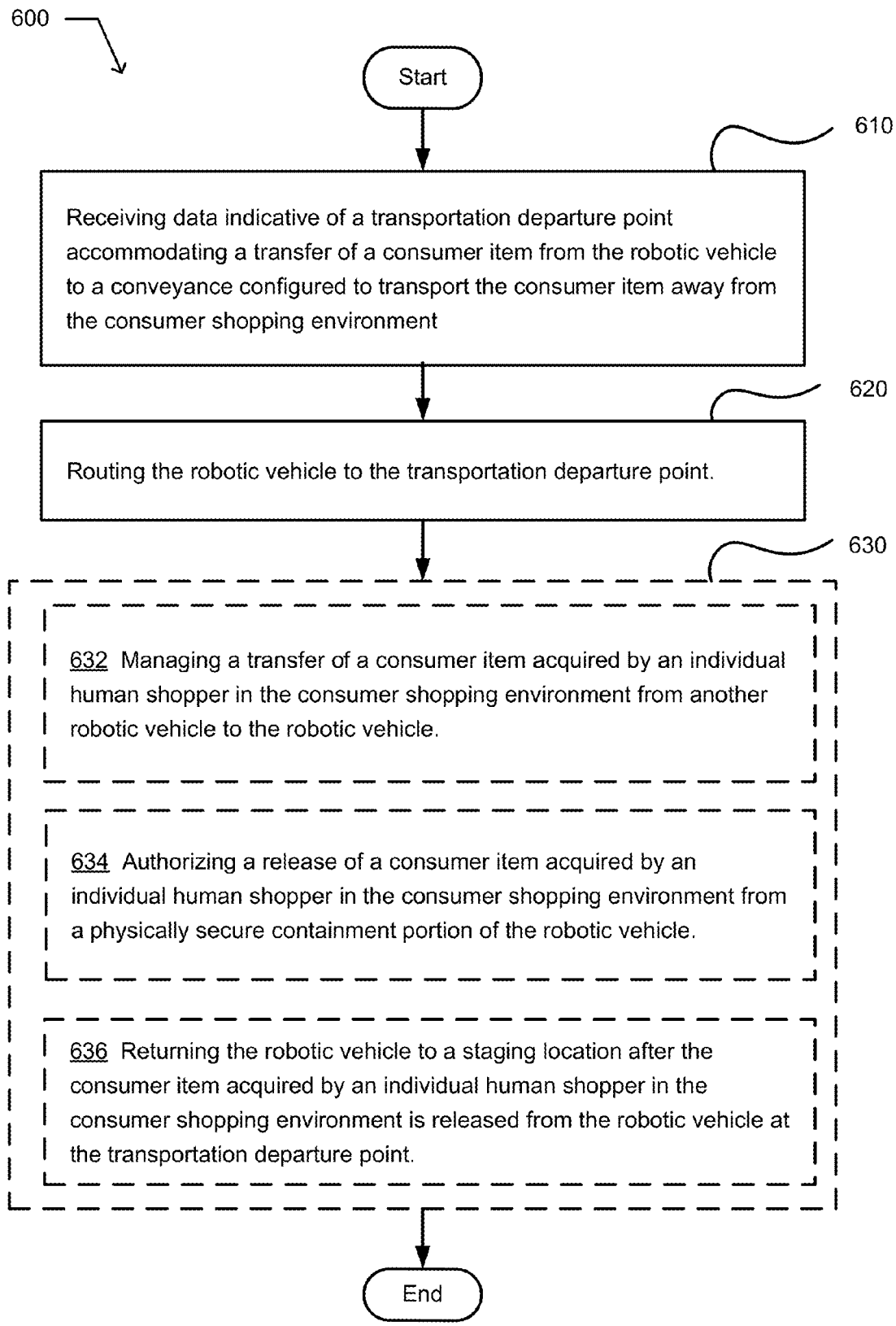

FIG. 7

710 Non-transitory computer readable storage media

712 One or more instructions for receiving data indicative of a transportation departure point accommodating a transfer of a consumer item from the robotic vehicle to a conveyance configured to transport the consumer item away from the consumer shopping environment.

714 One or more instructions for routing the robotic vehicle to the transportation departure point.

716 One or more instructions for managing a transfer of a consumer item acquired by an individual human shopper in the consumer shopping environment from another robotic vehicle to the robotic vehicle.

718 One or more instructions for authorizing a release of a consumer item acquired by the individual human shopper in the consumer shopping environment from a physically secure containment portion of the robotic vehicle.

722 One or more instructions for returning the robotic vehicle to a staging location after the consumer item acquired by an individual human shopper in the consumer shopping environment is delivered to the transportation departure point.

812 A receiver module configured to receive data indicative of a transportation departure point accommodating a transfer of a consumer item from the robotic vehicle to a conveyance configured to transport the consumer item away from the consumer shopping environment.

814 A guidance module configured to route the robotic vehicle to the transportation departure point.

816 A handover module configured to manage a transfer of a consumer item acquired by an individual human shopper in the consumer shopping environment from another robotic vehicle to the robotic vehicle.

818 A discharge module configured to release a consumer item acquired by an individual human shopper in the consumer shopping environment from a physically secure containment portion of the robotic vehicle.

1212 An identification module configured to recognize an individual human shopper placing a consumer item in the robotic vehicle.

1214 A guidance module configured to route the robotic vehicle along a path following the recognized individual human shopper through the consumer shopping environment (hereafter "shopper-following movement").

1216 An interruption module configured to suspend the shopper-following movement of the robotic vehicle in response to a suspension criteria.

1218 A restart module configured to resume the shopper-following movement of the robotic vehicle in response to a resumption criteria.

1222 A receiver module 1222(a) configured to receive data indicative of a location of the individual human shopper in the consumer shopping environment; and a guidance module 1222(b) configured to route the robotic vehicle to the location of the individual human shopper in the consumer shopping environment.

PACKAGE MANAGEMENT SYSTEM FOR ROBOTIC VEHICLES

If an Application Data Sheet (ADS) has been filed on the filing date of this application, it is incorporated by reference herein. Any applications claimed on the ADS for priority under 35 U.S.C. § § 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

PRIORITY APPLICATIONS

None.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

SUMMARY

For example, and without limitation, an embodiment of the subject matter described herein includes a package management system for operating a robotic vehicle configured to transport consumer items selected by a human shopper from a consumer shopping environment and placed in the robotic vehicle. The package management system includes circuitry for receiving data indicative of a transportation departure point accommodating a transfer of a consumer item from the robotic vehicle to a conveyance configured to transport the consumer item away from the consumer shopping environment. The package management system includes circuitry for routing the robotic vehicle to the transportation departure point.

In an embodiment, the package management system includes circuitry for wirelessly transmitting data indicative of an estimated arrival time of the robotic vehicle. In an embodiment, the package management system includes circuitry for managing a transfer of a consumer item acquired by an individual human shopper in the consumer shopping environment from the robotic vehicle to the conveyance at the transportation departure point. In an embodiment, the package management system includes circuitry for authorizing a release of a consumer item acquired by an individual human shopper in the consumer shopping environment from a physically secure containment portion of the robotic vehicle. In an embodiment, the package management system includes circuitry for returning the robotic vehicle to a staging location after the consumer item acquired by an individual human shopper in the consumer shopping environment is delivered to the transportation departure point.

For example, and without limitation, an embodiment of the subject matter described herein includes a computationally-implemented method of operating a robotic vehicle configured to transport consumer items selected by a human shopper from a consumer shopping environment and placed in the robotic vehicle. The method includes receiving data indicative of a transportation departure point accommodating a transfer of a consumer item from the robotic vehicle to a conveyance configured to transport the consumer item away from the consumer shopping environment. The method includes routing the robotic vehicle to the transportation departure point.

In an embodiment, the method includes managing a transfer of a consumer item acquired by an individual human shopper in the consumer shopping environment from another robotic vehicle to the robotic vehicle. In an embodiment, the method includes authorizing a release of a consumer item acquired by an individual human shopper in the consumer shopping environment from a physically secure containment portion of the robotic vehicle. In an embodiment, the method includes returning the robotic vehicle to a staging location after the consumer item acquired by an individual human shopper in the consumer shopping environment is released from the robotic vehicle at the transportation departure point.

For example, and without limitation, an embodiment of the subject matter described herein includes an article of manufacture for operating a robotic vehicle configured to transport consumer items selected by a human shopper from a consumer shopping environment and placed in the robotic vehicle. The article of manufacture includes a non-transitory computer readable storage media. The media bearing one or more instructions for receiving data indicative of a transportation departure point accommodating a transfer of a consumer item from the robotic vehicle to a conveyance configured to transport the consumer item away from the consumer shopping environment. The media bearing one or more instructions for routing the robotic vehicle to the transportation departure point.

In an embodiment, the non-transitory computer readable storage media bears one or more instructions for managing a transfer of a consumer item acquired by an individual human shopper in the consumer shopping environment from another robotic vehicle to the robotic vehicle. In an embodiment, the non-transitory computer readable storage media bears one or more instructions for authorizing a release of a consumer item acquired by an individual human shopper in the consumer shopping environment from a physically secure containment portion of the robotic vehicle. In an embodiment, the non-transitory computer readable storage media bears one or more instructions for returning the robotic vehicle to a staging location after the consumer item acquired by an individual human shopper in the consumer shopping environment is delivered to the transportation departure point.

For example, and without limitation, an embodiment of the subject matter described herein includes a system in the form of a machine, article of manufacture, or composition of matter for operating a robotic vehicle configured to transport consumer items selected by a human shopper from a consumer shopping environment and placed in the robotic vehicle. The system includes a receiver module configured to receive data indicative of a transportation departure point accommodating a transfer of a consumer item from the robotic vehicle to a conveyance configured to transport the consumer item away from the consumer shopping environment. The system includes a guidance module configured to route the robotic vehicle to the transportation departure point.

In an embodiment, the system includes a handover module configured to manage a transfer of a consumer item acquired by an individual human shopper in the consumer shopping environment from another robotic vehicle to the robotic vehicle. In an embodiment, the system includes a discharge module configured to release of a consumer item acquired by an individual human shopper in the consumer shopping environment from a physically secure containment portion of the robotic vehicle. In an embodiment, the system includes a homing module configured to return the robotic vehicle to a staging location after the consumer item acquired by an individual human shopper in the consumer shopping environment is delivered to the transportation departure point.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 6 illustrates an example computationally-implemented method 600 of operating a robotic vehicle configured to transport consumer items selected by a human shopper from a consumer shopping environment and placed in the robotic vehicle;

FIG. 7 illustrates an example article of manufacture 700 for operating a robotic vehicle configured to transport consumer items selected by a human shopper from a consumer shopping environment and placed in the robotic vehicle;

FIG. 8 illustrates a system 800 in the form of a machine, article of manufacture, or composition of matter for operating a robotic vehicle configured to transport consumer items selected by a human shopper from a consumer shopping environment and placed in the robotic vehicle;

FIG. 12 illustrates an example system 1200 in the form of a machine, article of manufacture, or composition of matter for operating a robotic vehicle configured to transport consumer items selected by a human shopper from a consumer shopping environment and placed in the robotic vehicle.

DETAILED DESCRIPTION

Figure 1:
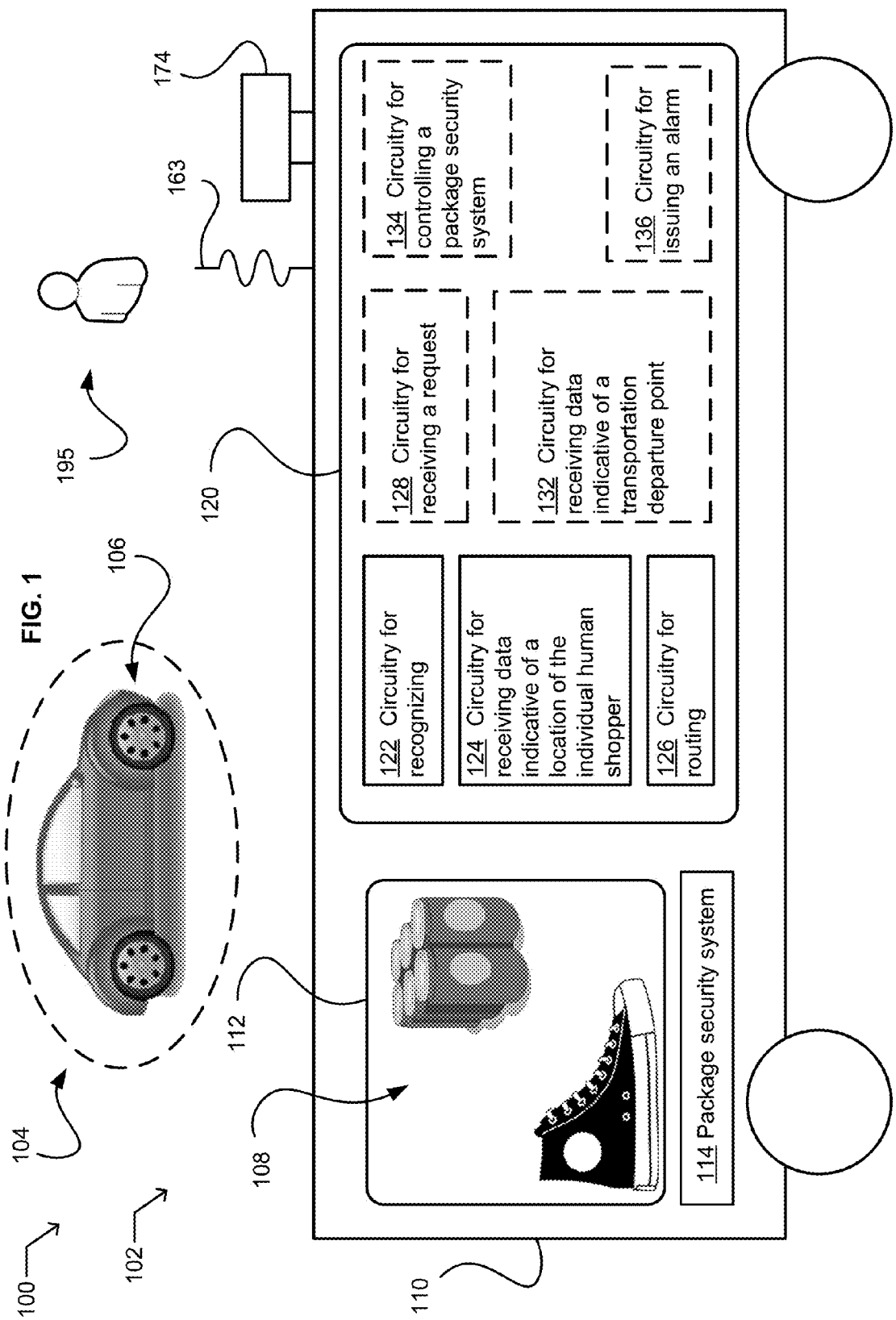
FIG. 1 illustrates an environment 100 in which embodiments may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various implementations by which processes and/or systems and/or other technologies described herein can be effected (e.g., hardware, software, and/or firmware), and that the preferred implementation will vary with the context in which the processes and/or systems and/or other technologies are deployed. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Hence, there are several possible implementations by which the processes and/or devices and/or other technologies described herein may be effected, none of which is inherently superior to the other in that any implementation to be utilized is a choice dependent upon the context in which the implementation will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to implement an operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described below. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, module, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will also recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will further recognize that at least a portion of the devices and/or processes described herein can be integrated into an image processing system. A typical image processing system may generally include one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch-sensitive screen or display surface, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will likewise recognize that at least some of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch-sensitive screen or display surface, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

FIG. 1 illustrates an environment 100 in which embodiments may be implemented. The environment includes a package management system 120 for operating a robotic vehicle 110 configured to transport one or more consumer items 108 selected by a human shopper from a consumer shopping environment 102 and placed in the robotic vehicle. In an embodiment, the consumer shopping environment may include a store, a mall with at least two stores, an airport shopping area, or an amusement park. In an embodiment, the consumer items include retail consumer items.

The package management system 120 includes circuitry for recognizing 122 an individual human shopper 195. The package management system includes circuitry for receiving data 124 indicative of a location of the individual human shopper 195 in the consumer shopping environment 102. In an embodiment, the received data may include tracking data from mobile cellular device carried by the individual human shopper, or tracking data from trackers incorporated in the consumer shopping environment 102. The package management system includes circuitry for routing 126 the robotic vehicle to the location of the individual human shopper in the consumer shopping environment. In an embodiment, the robotic vehicle may follow independent route through consumer shopping environment, an independent route through a store of the consumer shopping environment, or a parking lot of the consumer shopping environment. In an embodiment, the robotic vehicle may remain out of sight of the individual human shopper until otherwise commanded by the individual human shopper.

In an embodiment, the robotic vehicle 110 includes a machine that moves "autonomously" on the ground or in the air. In an embodiment, the robotic vehicle includes a vehicle that is "unmanned" in a sense that no humans are on board. In an embodiment, the robotic vehicle includes a vehicle that moves by itself, under their own power, with sensors and computational resources onboard to guide its motion. In an embodiment, the robotic vehicle may include a vehicle that integrates some form of human oversight or supervision of motion or task execution. In an embodiment, the robotic vehicle may include a body with a consumer item carrier, such as a secure portion 112, a control system, a propulsion system configured to operate the robotic vehicle at a human walking speed, a steering device, or a guidance system. In an embodiment, the robotic vehicle may include a wheeled or tracked robotic vehicle. In an embodiment, the robotic vehicle may include a wireless communication device 163, which may include a cellular communications device. In an embodiment, the robotic vehicle may include a sensor 174. The sensor may include an optical sensor, an infrared sensor, an acoustic sensor, or a radar sensor.

In an embodiment, the circuitry for recognizing 122 an individual human shopper 195 includes circuitry for recognizing an individual human shopper placing a consumer item 108 in the robotic vehicle 110. In an embodiment, the circuitry for recognizing an individual human shopper includes circuitry for identifying an individual human shopper placing a consumer item in the robotic vehicle.

In an embodiment, the circuitry for receiving data 124 includes circuitry for receiving data indicative of a current location of the individual human shopper in the consumer shopping environment. In an embodiment, the circuitry for receiving data includes circuitry for (i) receiving a data signal transmitted by a wireless device carried by the individual human shopper and (ii) determining the current location of the individual human shopper in response to the received data signal. For example, the data signal may be transmitted by a beacon or mobile cellular device carried by the individual human shopper. In an embodiment, the circuitry for receiving data includes circuitry for receiving position-related data from a shopper tracking system or database. For example, the data signal may be sourced from location-tracking database or system associated with or operated by the consumer shopping environment. For example, the data signal may be sourced from a review of video images.

In an embodiment, the circuitry for routing 126 includes circuitry for routing the robotic vehicle 110 to the current location of the individual human shopper 195 at least partially based on a travel limitation of the robotic vehicle. For example, a travel limitation may include the need to use elevators rather than stairs or escalators; or need to avoid crowds, speed limitations, etc. In an embodiment, the circuitry for routing includes circuitry for planning a route and initiating a movement of the robotic vehicle along the planned route to the current location of the individual human shopper in the consumer shopping environment. In an embodiment, the circuitry for routing includes circuitry for predicting a future location of the individual human shopper, planning a route, and initiating a movement of the robotic vehicle along the planned route to the predicted future location of the individual human shopper in the consumer shopping environment. In an embodiment, the circuitry for routing includes circuitry for routing the robotic vehicle first to a designated intermediate location (e.g., a checkout lane) and then to the predicted future location of the individual human shopper in the consumer shopping environment.

In an embodiment, the package management system 120 includes circuitry for receiving a request 128 originated by the individual human shopper 195. In an embodiment, the request includes a request to move the robotic vehicle 110 to the location of the individual human shopper. In an embodiment, the request includes a designated time at which the robotic vehicle is to move to the location of the individual human shopper. In an embodiment, the request is transmitted by a mobile cellular device associated with the individual human shopper. In an embodiment, the request includes the location of the mobile cellular device. In an embodiment, the request includes a request originated by the individual human shopper to suspend routing the robotic vehicle to the location of the individual human shopper. For example, in an embodiment, the individual human shopper may explicitly direct verbally or by gestures the robotic vehicle to leave individual human shopper. For example, in an embodiment, the robotic vehicle may be implicitly told to leave individual human shopper by the individual human shopper entering a restricted location. For example, in an embodiment, the robotic vehicle can be implicitly told to leave individual human shopper when individual human shopper enters a non-robotic vehicle-traversable portal, such as a crowded aisle, an escalator, or stairwell. In an embodiment, the request includes a request originated by the individual human shopper that the robotic vehicle resume routing the robotic vehicle to the location of the individual human shopper. In an embodiment, the request includes a request originated by the individual human shopper that the robotic vehicle moves to the location of the individual human shopper.

In an embodiment, the package management system 120 includes circuitry for receiving data indicative of a transportation departure point 132 selected by the individual human shopper. The transportation departure point accommodating a transfer of a consumer item 108 from the robotic vehicle 110 to a conveyance 106 configured to transport the consumer item away from the consumer shopping environment 102. In an embodiment, the transportation departure point includes a surface transportation departure point. In this embodiment, the circuitry for routing 126 includes circuitry for routing the robotic vehicle to the transportation departure point.

In an embodiment, the package management system 120 includes circuitry 134 for controlling a package security system 114 protecting consumer items 108 placed in a secure portion 112 of the robotic vehicle 110 against an unauthorized removal. In an embodiment, the secure portion includes a secure item carrier. In an embodiment, the robotic vehicle is configured to physically protect consumer items, for example by a locking top. In an embodiment, the unauthorized removal includes a removal of a consumer item from the secure portion of the robotic vehicle by a person other than the recognized individual human shopper. In an embodiment, the unauthorized removal includes an attempted entry by a hand of a person other than the recognized individual human shopper into the secure portion of the robotic vehicle. For example, the circuitry for controlling a package security system may be asymmetric, e.g., allow inward hand penetration, but forbid outward hand movement. In an embodiment, the circuitry for controlling the package security system includes a selectively-activated circuitry for controlling the package security system. In an embodiment, the selectively-activated circuitry is activated if the individual human shopper is physically separated from the robotic vehicle for more than a specified time. In an embodiment, the selectively-activated circuitry is activated if the individual human shopper is physically separated from the robotic vehicle by more than a specified distance. In an embodiment, the selectively-activated circuitry is activated if a gaze or head direction of the individual human shopper is away from the robotic vehicle for more than a specified time. In an embodiment, the selectively-activated circuitry is activated if the robotic vehicle is motionless for more than a specified time.

In an embodiment, the package management system 120 includes circuitry for issuing an alarm 136 upon detection of an unauthorized removal or attempted unauthorized removal of a consumer item 108 from the secure portion 112 of the robotic vehicle. In an embodiment, the secure portion includes a secure item carrier or a secure consumer item carrier. For example, the package management system of the robotic vehicle can virtually protect consumer items by issuing an alert when objects traverse a cart perimeter. For example, the robotic vehicle can protect the goods while separated from individual human shopper or while waiting for the individual human shopper. In an embodiment, the robotic vehicle may include locking top, or have alarm for entry/exit (hand, goods, etc.) through cart perimeter.

Figure 2:
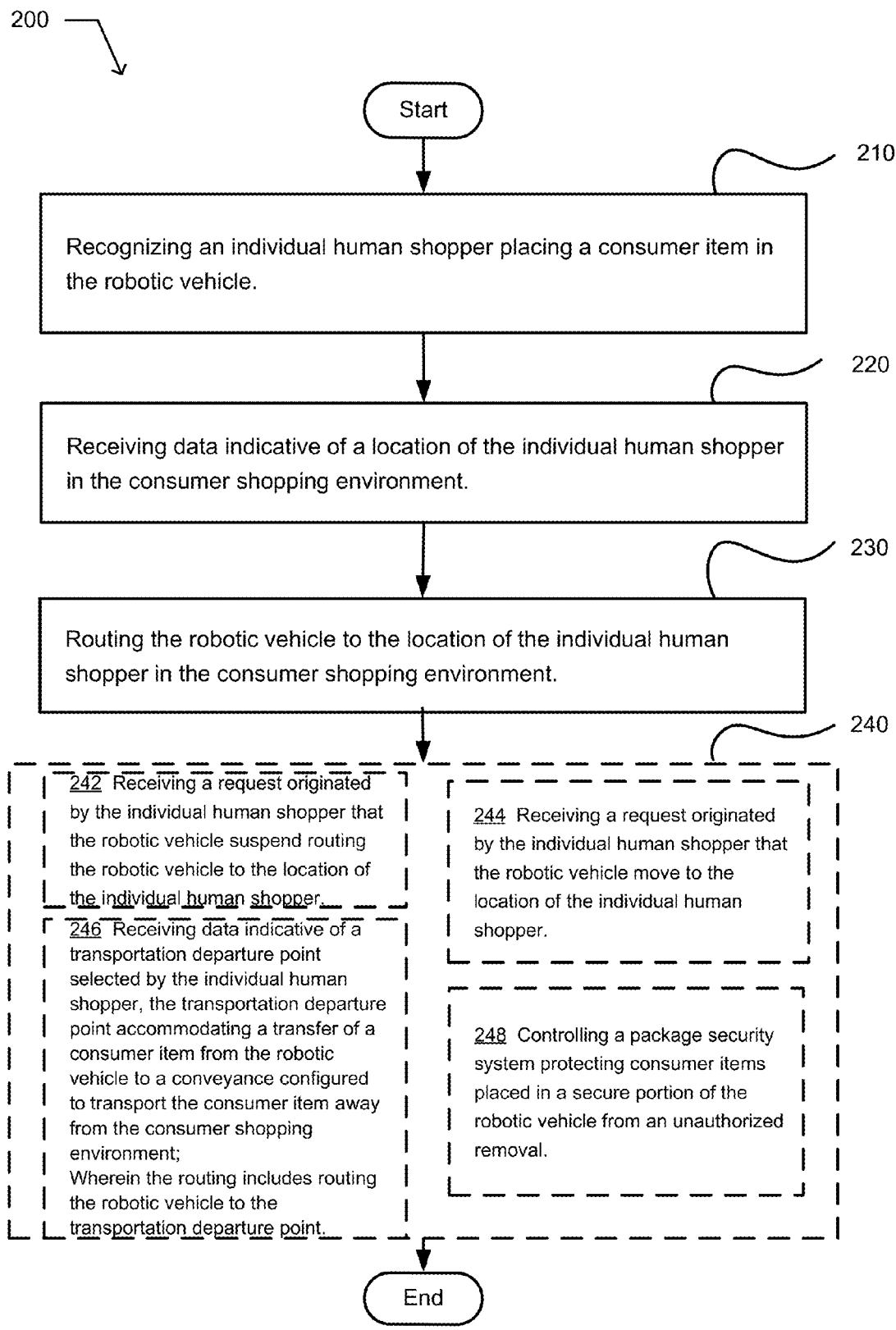
FIG. 2 illustrates an example computationally-implemented method 200 of operating a robotic vehicle configured to transport consumer items selected by a human shopper from a consumer shopping environment and placed in the robotic vehicle.

FIG. 2 illustrates an example computationally-implemented method of operating a robotic vehicle configured to transport consumer items selected by a human shopper from a consumer shopping environment and placed in the robotic vehicle. The method includes an operational flow 200. After a start operation, the operational flow includes a distinguishing operation 210 recognizing an individual human shopper placing a consumer item in the robotic vehicle. In an embodiment, the distinguishing operation may be implemented using the circuitry for recognizing 122 described in conjunction with FIG. 1. The operational flow includes a reception operation 220 receiving data indicative of a location of the individual human shopper in the consumer shopping environment. In an embodiment, the reception operation may be implemented using the circuitry for receiving data 124 indicative of a location of the individual human shopper described in conjunction with FIG. 1. The operational flow includes a following operation 230 routing the robotic vehicle to the location of the individual human shopper in the consumer shopping environment. In an embodiment, the following operation may be implemented using circuitry for routing 126 described in conjunction with FIG. 1. The operational flow includes an end operation.

In an embodiment, an operational flow of the method 200 may include at least one additional operation 240. An additional operation may include an operation 242 receiving a request originated by the individual human shopper that the robotic vehicle suspend routing the robotic vehicle to the location of the individual human shopper. In an embodiment, an additional operation may include an operation 244 receiving a request originated by the individual human shopper that the robotic vehicle move to the location of the individual human shopper. In an embodiment, an additional operation may include an operation 246 receiving data indicative of a transportation departure point selected by the individual human shopper. The transportation departure point accommodating a transfer of a consumer item from the robotic vehicle to a conveyance configured to transport the consumer item away from the consumer shopping environment. In operation 246, the following operation includes routing the robotic vehicle to the transportation departure point. In an embodiment, an additional operation may include an operation 248 controlling a package security system protecting consumer items placed in a secure portion of the robotic vehicle from an unauthorized removal.

Figure 3:
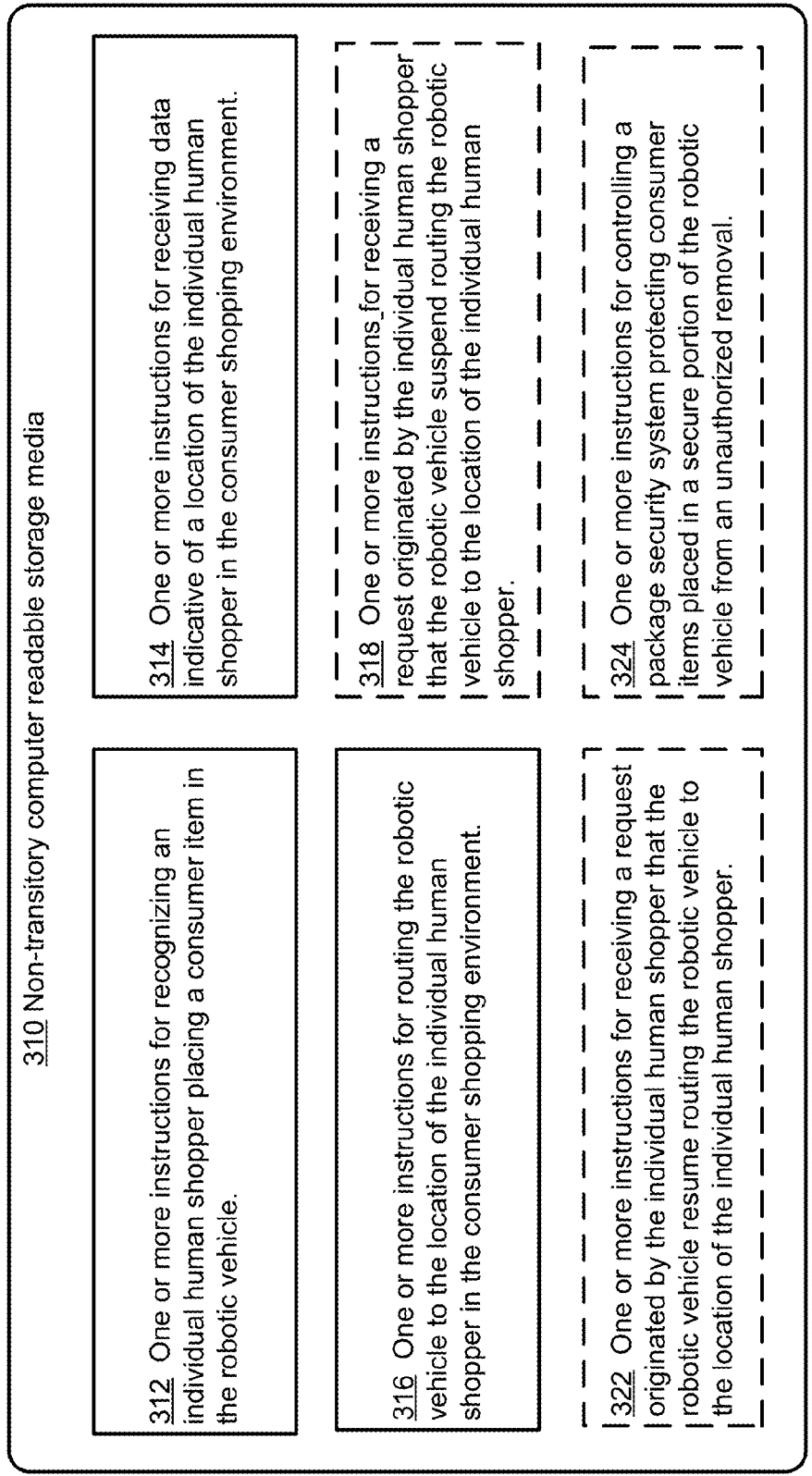
FIG. 3 illustrates an example article of manufacture 300 for operating a robotic vehicle configured to transport consumer items selected by a human shopper from a consumer shopping environment and placed in the robotic vehicle.

FIG. 3 illustrates an example article of manufacture 300 for operating a robotic vehicle configured to transport consumer items selected by a human shopper from a consumer shopping environment and placed in the robotic vehicle. The article of manufacture includes a non-transitory computer readable storage media 310. The non-transitory computer readable storage media bearing one or more instructions 312 for recognizing an individual human shopper placing a consumer item in the robotic vehicle. The non-transitory computer readable storage media bearing one or more instructions 314 for receiving data indicative of a location of the individual human shopper in the consumer shopping environment. The non-transitory computer readable storage media bearing one or more instructions 316 for routing the robotic vehicle to the location of the individual human shopper in the consumer shopping environment.

In an embodiment, the non-transitory computer readable storage media 310 further bears one or more instructions 318 for receiving a request originated by the individual human shopper that the robotic vehicle suspend routing the robotic vehicle to the location of the individual human shopper. In an embodiment, the non-transitory computer readable storage media further bears one or more instructions 322 for receiving a request originated by the individual human shopper that the robotic vehicle resume routing the robotic vehicle to the location of the individual human shopper. In an embodiment, the non-transitory computer readable storage media further bears one or more instructions 324 for controlling a package security system protecting consumer items placed in a secure portion of the robotic vehicle from an unauthorized removal.

Figure 4:
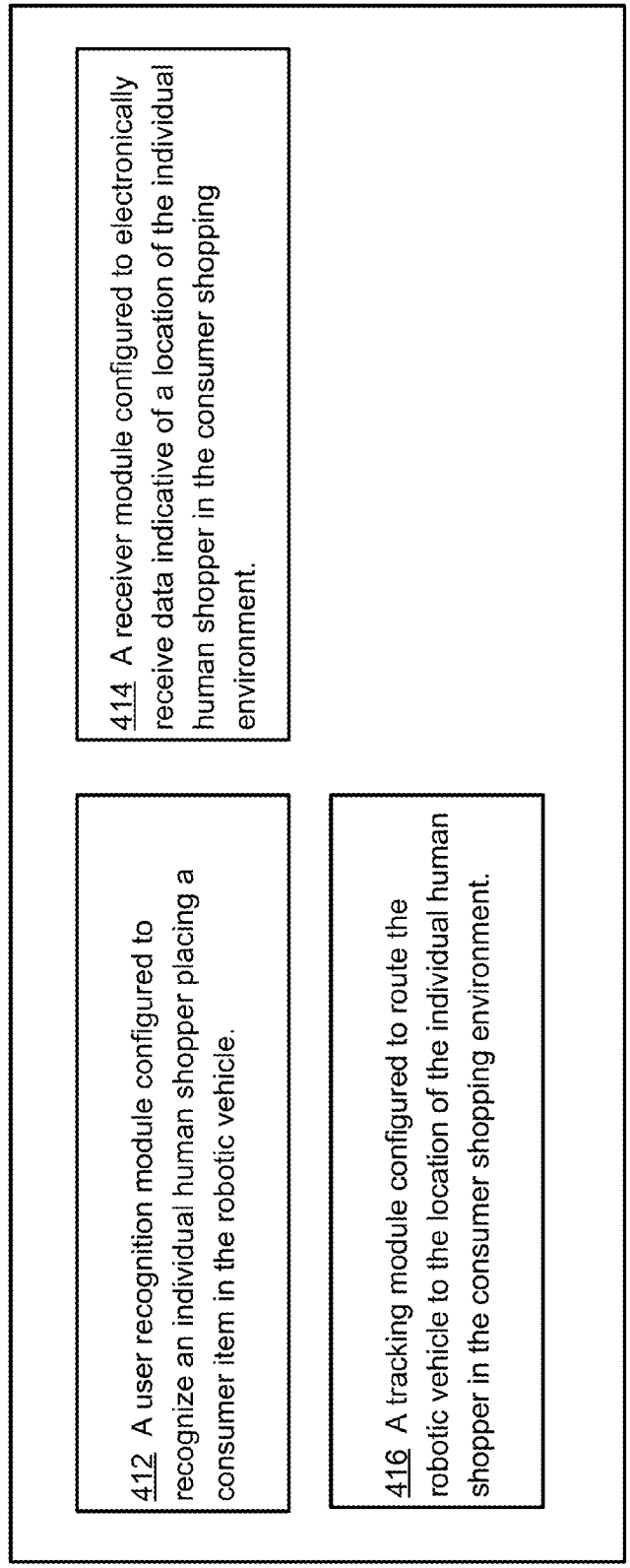
FIG. 4 illustrates an example system 400 in the form of a machine, article of manufacture, or composition of matter for operating a robotic vehicle configured to transport consumer items selected by a human shopper from a consumer shopping environment and placed in the robotic vehicle.

FIG. 4 illustrates an example system 400 in the form of a machine, article of manufacture, or composition of matter for operating a robotic vehicle configured to transport consumer items selected by a human shopper from a consumer shopping environment and placed in the robotic vehicle. The system includes a user recognition module 412 configured to recognize an individual human shopper placing a consumer item in the robotic vehicle. The system includes a receiver module 414 configured to electronically receive data indicative of a location of the individual human shopper in the consumer shopping environment. The system includes a tracking module 416 configured to route the robotic vehicle to the location of the individual human shopper in the consumer shopping environment.

Figure 5:
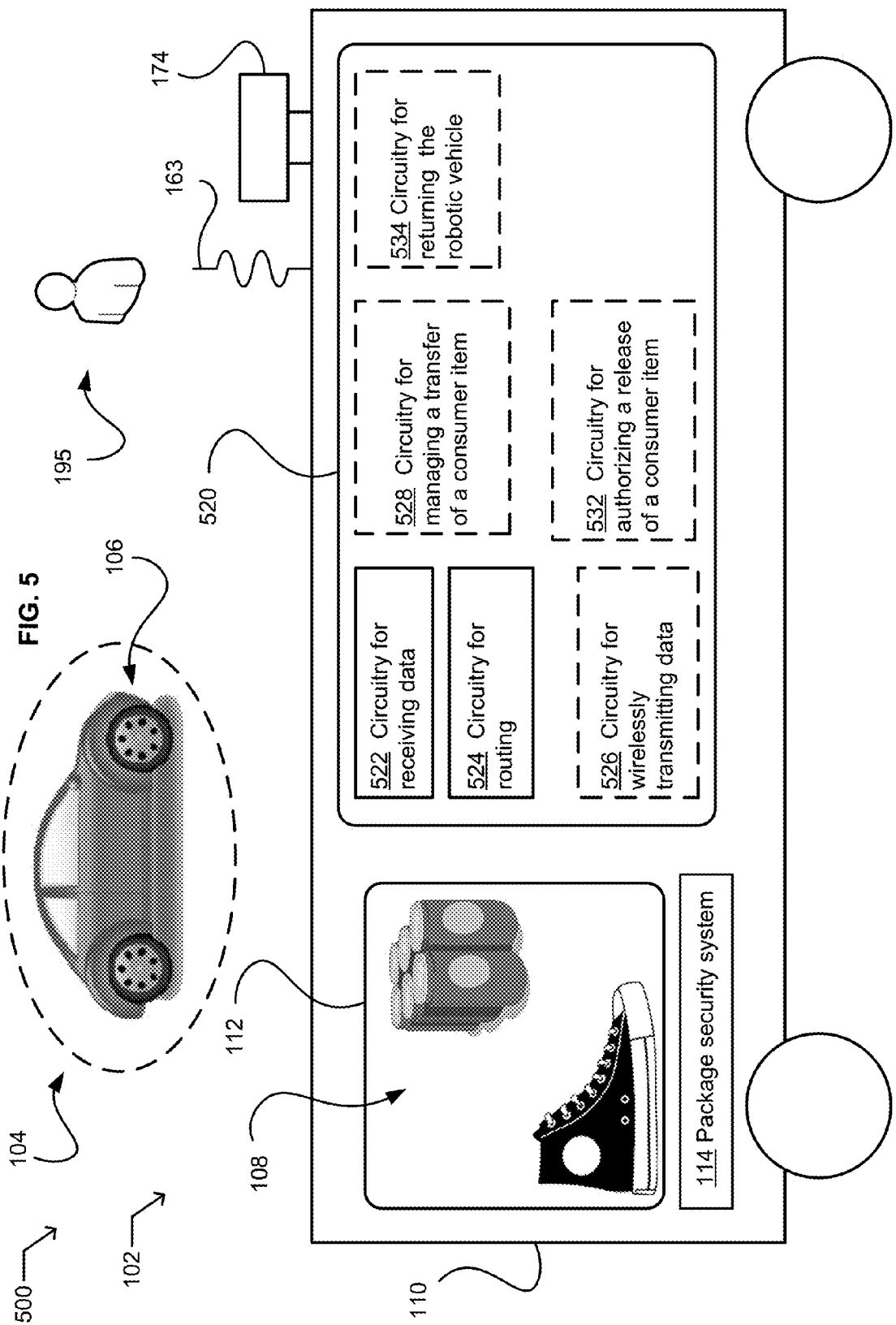
FIG. 5 illustrates an example environment 500 in which embodiments may be implemented.

FIG. 5 illustrates an example environment 500 in which embodiments may be implemented. The environment includes a package management system 520 for operating the robotic vehicle 110 configured to transport consumer items 108 selected by a human shopper from a consumer shopping environment 102 and placed in the robotic vehicle. The package management system includes circuitry for receiving data 522 indicative of a transportation departure point 104 accommodating a transfer of a consumer item 108 from the robotic vehicle to a conveyance 106 configured to transport the consumer item away from the consumer shopping environment. In an embodiment, the transportation departure point includes a surface transportation departure point. In an embodiment, the transportation departure point is within or near to the consumer shopping environment. In an embodiment, the transportation departure point is a vehicular exit point from the consumer shopping environment. In an embodiment, the conveyance includes a public conveyance, such as for example a taxi, bus, common carrier, ship, or aircraft. In an embodiment, the conveyance includes a private conveyance, such as for example a private car, ship, or aircraft. In an embodiment, the conveyance includes a conveyance configured to transport the consumer item away from the consumer shopping environment over a public transportation corridor or system. For example, a public transportation corridor or system may include a public road, rail line, or air route. The package management system includes circuitry for routing 524 the robotic vehicle to the departure point.

In an embodiment, the circuitry for receiving data 522 includes circuitry for receiving data indicative of the transportation departure point 104 selected by the individual human shopper 195. In an embodiment, the circuitry for receiving data includes circuitry for receiving data indicative of a location of the departure point from the individual human shopper 195. For example, the data indicative of a location of the departure point may be generated by the individual human shopper explicitly indicate the location of the departure point by voice or showing tag. In an embodiment, the circuitry for receiving data includes circuitry for receiving data indicative of a location of the departure point from a wireless mobile device carried by the individual human shopper. In an embodiment, the circuitry for receiving data includes circuitry for receiving data indicative of a particular conveyance 106 at the departure point designated by the individual human shopper. For example, the particular conveyance may include a particular bus or train identified by route, destination, or arrival time at the departure point. In an embodiment, the circuitry for receiving data includes circuitry for (i) receiving data indicative of an attribute of a particular conveyance at the departure point and (ii) determining the location of the particular conveyance at the departure point at least partially based on the attribute of the particular conveyance. For example, in an embodiment, the attribute of a particular conveyance may include a description, such as model, color, make or license number of a car. For example, in an embodiment, the attribute of a particular conveyance may include an identifier of a parking space occupied by the car. For example, in an embodiment, the attribute of a particular conveyance may be acquired from a parking lot database, by a physical search algorithm of the parking lot, by a virtual search algorithm (e.g., looking at camera views), and the like. For example, in an embodiment, the attribute of a particular conveyance may be acquired from data indicative of where the individual human shopper entered the consumer shopping environment, or where the individual human shopper acquired the robotic vehicle. For example, the individual human shopper may have acquired the robotic vehicle at a bus stop, train stop, or monorail stop. In an embodiment, the circuitry for receiving data includes circuitry for (i) receiving data indicative of historical movements of the individual human shopper, and (ii) determining a location of the departure point at least partially based on the historical movements of the individual human shopper. For example, the data indicative of historical movements of the individual human shopper may include tracking data. For example, the data indicative of historical movements of the individual human shopper may include data indicative of historical movements of the individual human shopper toward or into the consumer shopping environment. For example, the robotic vehicle may determine the conveyance's location by backtracking individual human shopper's motion from historical camera footage (e.g., from entry into store/mall backwards to departure from car).

In an embodiment, the circuitry for routing 524 includes circuitry for routing the robotic vehicle 110 to the departure point 104 and determining an estimated arrival time of the robotic vehicle at the departure point. For example, the robotic vehicle may be routed directly to the departure point, or the circuitry for routing may schedule arrival based on a preset time, or at a departure time of individual human shopper from store/mall. For example, the departure time may be based on camera footage, or on being told the time by the individual human shopper 195.

In an embodiment, the circuitry for receiving data 522 includes circuitry for receiving data indicative of an arrival time of the individual human shopper 195 at the departure point 104. In an embodiment, the circuitry for receiving data includes circuitry for receiving a query regarding an estimated arrival time of the individual human shopper at the departure point.

In an embodiment, the package management system 520 includes circuitry for wirelessly transmitting data 526 indicative of the estimated arrival time of the robotic vehicle 110. In an embodiment, the data indicative of the estimated arrival time is in a format usable by a wireless cellular device.

In an embodiment, the package management system 520 includes circuitry for managing 528 a transfer of a consumer item 108 acquired by the individual human shopper 195 in the consumer shopping environment 102 from the robotic vehicle 110 to the conveyance 106 at the departure point 104. In an embodiment, the circuitry for managing a transfer further includes circuitry for managing a transfer of the consumer item from another robotic vehicle to the robotic vehicle 110. For example, the robotic vehicle may receive a consumer item directly from the individual human shopper while they are shopping, or indirectly after the consumer item has been paid for or ordered by individual human shopper. In an embodiment, the circuitry for managing a transfer further includes circuitry for managing a transfer of the consumer item from a staging location to the robotic vehicle.

In an embodiment, the package management system 520 includes circuitry for authorizing 532 a release of a consumer item 108 acquired by the individual human shopper 195 in the consumer shopping environment 102 from a secure portion 112 of the robotic vehicle 110. In an embodiment, the circuitry for authorizing a release of a consumer item includes circuitry for authorizing in response to an authorization originated by the individual human shopper a release of a consumer item acquired by the individual human shopper from a secure portion of the robotic vehicle. In an embodiment, for example, the authorization may include entry of a code, or a signal from a wireless mobile cellular device. In an embodiment, the robotic vehicle protects the consumer item or items until they are delivered to the conveyance or to the individual human shopper. For example, the robotic vehicle may include locking top or cover; it may have an alarm for entry/exit of a hand or removal of a consumer item through a perimeter of the robotic vehicle. In an embodiment, the circuitry for authorizing a release of a consumer item includes circuitry for authorizing in response to recognition of the individual human shopper a release of a consumer item acquired by the individual human shopper from a secure portion of the robotic vehicle. In an embodiment, for example, the recognition may include facial recognition or thumb print recognition. In an embodiment, the circuitry for authorizing a release of a consumer item includes circuitry for authorizing in response to receipt of an authorization token a release of a consumer item acquired by the individual human shopper from a secure portion of the robotic vehicle. In an embodiment, for example, the authorization may include a code, token, receipt, or the like. In an embodiment, the circuitry for authorizing a release of a consumer item includes circuitry for authorizing in response to receipt of a payment for the consumer item a release of a consumer item acquired by the individual human shopper from a secure portion of the robotic vehicle.

In an embodiment, the package management system 520 further includes circuitry for returning 534 the robotic vehicle 110 to a staging location after the consumer item 108 acquired by the individual human shopper 195 in the consumer shopping environment 102 is delivered to the departure point 104. In an embodiment, for example, the robotic vehicle can automatically return to "roost" after delivery of consumer items.

FIG. 6 illustrates an example computationally-implemented method of operating a robotic vehicle configured to transport consumer items selected by a human shopper from a consumer shopping environment and placed in the robotic vehicle. The method includes an operational flow 600. After a start operation, the operational flow includes a reception operation 610 receiving data indicative of a transportation departure point accommodating a transfer of a consumer item from the robotic vehicle to a conveyance configured to transport the consumer item away from the consumer shopping environment. In an embodiment, the reception operation may be implemented using the circuitry for receiving data 522 described in conjunction with FIG. 5. The operational flow includes a guidance operation 620 routing the robotic vehicle to the transportation departure point. In an embodiment, the guidance operation may be implemented using the circuitry for routing 524 described in conjunction with FIG. 5. The operational flow includes an end operation.

In an embodiment, the operational flow 600 may include at least one additional operation 630. The at least one additional operation may include managing 632 a transfer of a consumer item acquired by an individual human shopper in the consumer shopping environment from another robotic vehicle to the robotic vehicle. The at least one additional operation may include authorizing 634 a release of a consumer item acquired by an individual human shopper in the consumer shopping environment from a secure portion of the robotic vehicle. The at least one additional operation may include returning 636 the robotic vehicle to a staging location after the consumer item acquired by an individual human shopper in the consumer shopping environment is released from the robotic vehicle at the transportation departure point.

FIG. 7 illustrates an example article of manufacture 700 for operating a robotic vehicle configured to transport consumer items selected by a human shopper from a consumer shopping environment and placed in the robotic vehicle. The article of manufacture includes a non-transitory computer readable storage media 710. The non-transitory computer readable storage media bears one or more instructions 712 for receiving data indicative of a transportation departure point accommodating a transfer of a consumer item from the robotic vehicle to a conveyance configured to transport the consumer item away from the consumer shopping environment. The non-transitory computer readable storage media bears one or more instructions for routing the robotic vehicle to the transportation departure point.

In an embodiment, the non-transitory computer readable storage media 710 bears one or more instructions 716 for managing a transfer of a consumer item acquired by an individual human shopper in the consumer shopping environment from another robotic vehicle to the robotic vehicle. In an embodiment, the non-transitory computer readable storage media bears one or more instructions 718 for authorizing a release of a consumer item acquired by the individual human shopper in the consumer shopping environment from a secure portion of the robotic vehicle. In an embodiment, the non-transitory computer readable storage media bears one or more instructions 722 for returning the robotic vehicle to a staging location after the consumer item acquired by an individual human shopper in the consumer shopping environment is delivered to the transportation departure point.

FIG. 8 illustrates a system 800 in the form of a machine, article of manufacture, or composition of matter for operating a robotic vehicle configured to transport consumer items selected by a human shopper from a consumer shopping environment and placed in the robotic vehicle. The system includes a receiver module 812 configured to receive data indicative of a transportation departure point accommodating a transfer of a consumer item from the robotic vehicle to a conveyance configured to transport the consumer item away from the consumer shopping environment. The system includes a guidance module 814 configured to route the robotic vehicle to the transportation departure point.

In an embodiment, the system 800 includes a handover module 816 configured to manage a transfer of a consumer item acquired by an individual human shopper in the consumer shopping environment from another robotic vehicle to the robotic vehicle. In an embodiment, the system includes a discharge module 818 configured to release a consumer item acquired by an individual human shopper in the consumer shopping environment from a secure portion of the robotic vehicle. In an embodiment, the system includes a homing module configured to return the robotic vehicle to a staging location after the consumer item acquired by the individual human shopper in the consumer shopping environment is delivered to the transportation departure point.

Figure 9:
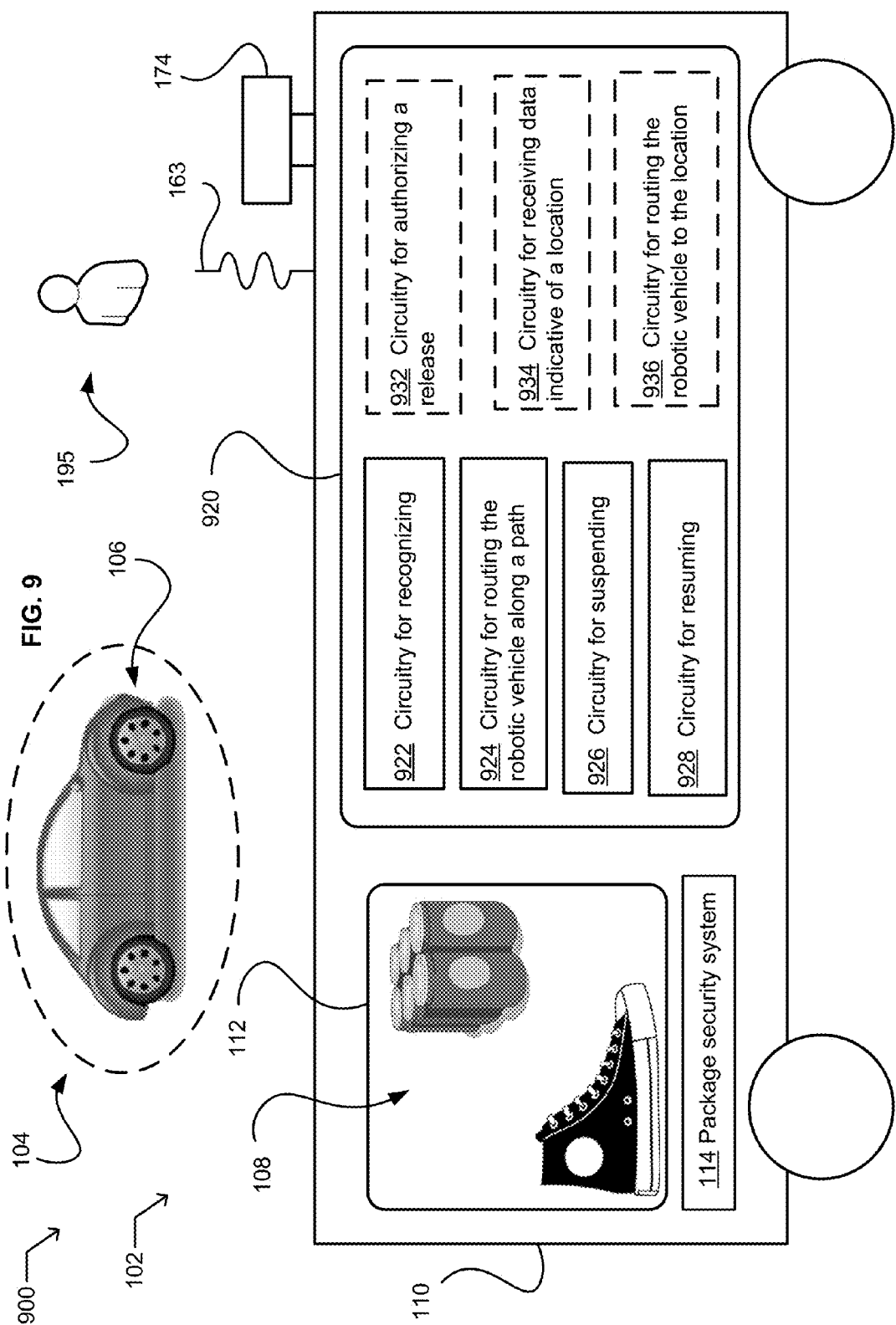
FIG. 9 illustrates an environment 900 that includes a package management system 920 for operating a robotic vehicle 110 configured to transport consumer items 108 selected by a human shopper from a consumer shopping environment 102 and placed in the robotic vehicle.

FIG. 9 illustrates an environment 900 that includes a package management system 920 for operating a robotic vehicle 110 configured to transport consumer items 108 selected by a human shopper from a consumer shopping environment 102 and placed in the robotic vehicle. The package management system includes circuitry for recognizing 922 an individual human shopper 195 placing a consumer item in the robotic vehicle. The package management system includes circuitry for routing 924 the robotic vehicle along a path following the recognized individual human shopper through the consumer shopping environment (hereafter "shopper-following movement"). In an embodiment, the circuitry for routing is further configured to maintain a specified proximity to the individual human shopper. The package management system includes circuitry for suspending 926 the shopper-following movement of the robotic vehicle in response to a suspension criteria. In an embodiment, suspension criteria include pre-established suspension criteria. The package management system includes circuitry for resuming 928 the shopper-following movement of the robotic vehicle in response to a resumption criteria. In an embodiment, resumption criteria include pre-established suspension criteria.

In an embodiment of the package management system 920, the circuitry for recognizing 922 an individual human shopper includes at least one of an optical recognition system, a facial recognition system, an object recognition system. In an embodiment, the circuitry for recognizing an individual human shopper includes at least one of a key pad, a microphone, a voice recognition system, a code recognition system, an RF receiver, or an IR receiver. For example, a recognition system may recognize the individual human shopper by their clothes or body shape. In an embodiment, the circuitry for recognizing an individual human shopper does not know the individual human shopper ahead of time, just bond to individual human shopper when they first meet, and then recognize individual human shopper thereafter.

In an embodiment of the circuitry for suspending 926, the suspension criteria includes the individual human shopper entering in a restricted location. For example, a restricted location may include a restroom, restaurant, or hair/nail salon. In an embodiment of the circuitry for suspending, the suspension criteria includes receipt of an instruction originated by the individual human shopper to wait. For example, the instruction may include a voice or gesture instruction. In an embodiment of the circuitry for suspending, the suspension criteria include receipt of a signal indicative of the individual human shopper entering a restricted location. For example, the signal may be received from an RFID tag mounted on wall, or from a visual recognition device. In an embodiment of the circuitry for suspending, the suspension criteria includes a spatial separation from the individual human shopper. For example, the suspension criteria may include stopping if separated from individual human shopper by more than six feet. For example, the suspension criteria may include the robotic vehicle entering a wait mode if separated from the individual human shopper for a specified time period or by a specified distance. In an embodiment of the circuitry for suspending, the suspension criteria includes a temporal separation from the individual human shopper. For example, a temporal separation may include a separation of more than ten seconds, one minute, two minutes, or the like. For example, the robotic vehicle can wait at or near a location where told or where it lost contact with individual human shopper.

In an embodiment, the package management system 920 includes circuitry for authorizing a release of a consumer item 932 acquired by the individual human shopper in the consumer shopping environment from a secure portion of the robotic vehicle. In an embodiment, the circuitry for authorizing a release of the consumer item acquired by the individual human shopper authorizes the release in response to at least one of the recognition of the individual human shopper or the resumption criteria. In an embodiment, the circuitry authorizing a release of the consumer item further includes circuitry for preventing or de-authorizing a release of the consumer item acquired by the individual human shopper from the secure portion of the robotic vehicle in response to the suspension criteria.

In an embodiment of the circuitry for resuming 928, the resumption criteria include the individual human shopper 195 leaving a restricted location. In an embodiment of the circuitry for resuming, the resumption criteria include receipt of an instruction originated by individual human shopper to resume the shopper-following movement. In an embodiment of the circuitry for resuming, the resumption criteria include a spatial separation from the individual human shopper of less than a specified distance.

In an embodiment of the circuitry for routing 924, the shopper-following movement of the robotic vehicle includes moving the robotic vehicle to a designated waiting location or another landmark if the suspension of the shopper-following movement exceeds a specified time.

In an embodiment of the circuitry for resuming 928, the resumption criteria include a receipt of an instruction to resume the shopper-following movement. For example the robotic vehicle 110 may be explicitly told where or when to reacquire the individual human shopper 195. For example, the circuitry for resuming may ask the individual human shopper for their location by communicating via a mobile cellular device carried by the individual human shopper. In an embodiment of the circuitry for resuming, the resumption criteria include the circuitry for resuming automatically finding the individual human shopper after lapse of a specified time. For example, the circuitry for resuming may track a beacon worn by the individual human shopper. For example, the circuitry for resuming may inquire from store/mall location-tracking database, such as surveillance camera footage. In an embodiment of the circuitry for resuming, the resumption criteria includes electronically (i) notifying the individual human shopper of a loss of contact or of its waiting location; can use text message, email, cell phone call, posted message on bulletin board; and (ii) receiving a meeting location from the package management system.

In an embodiment, the package management system 920 includes circuitry for receiving data indicative of a location 934 of the individual human shopper in the consumer shopping environment; and circuitry for routing 936 the robotic vehicle to the location of the individual human shopper.

Figure 10:
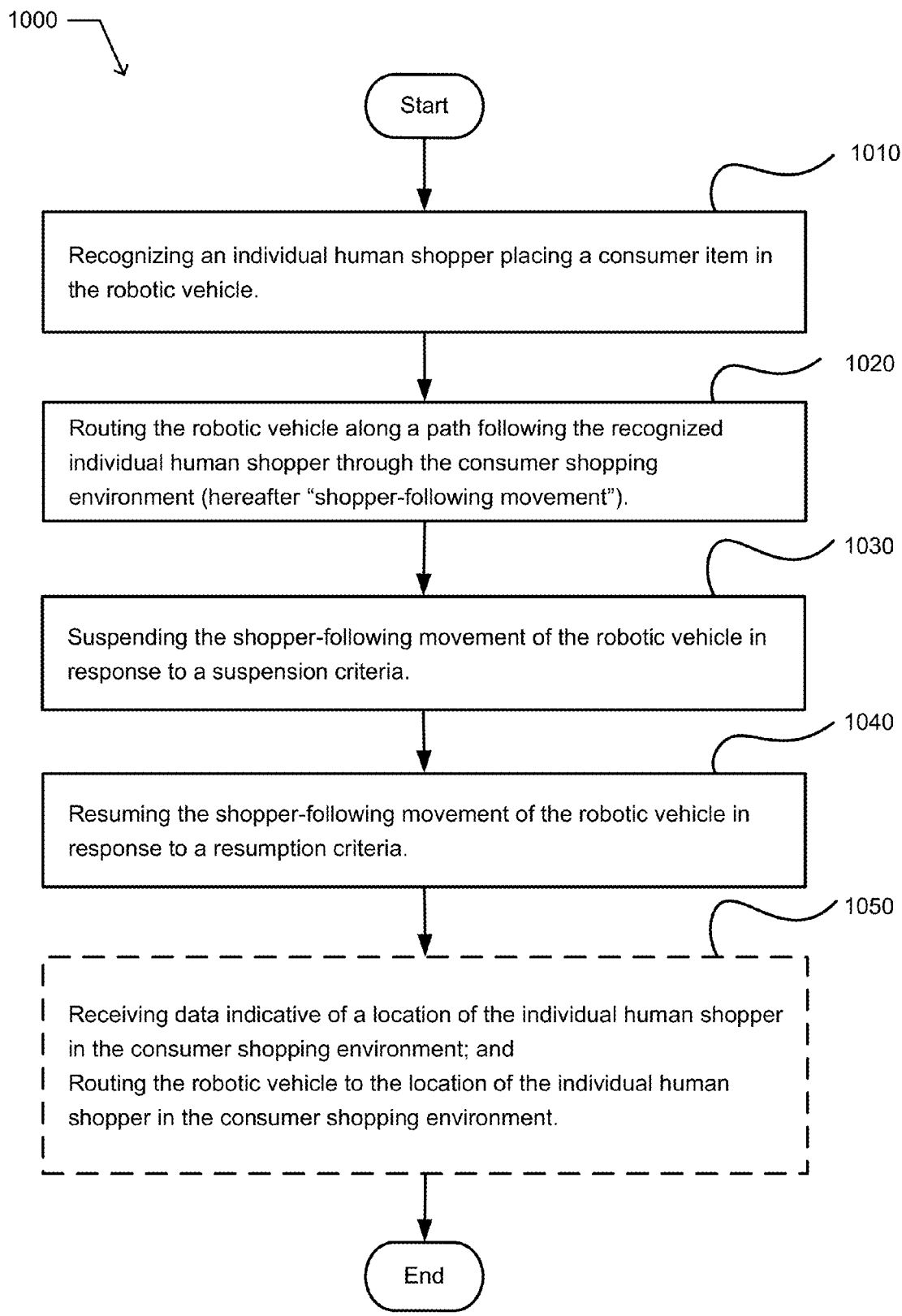
FIG. 10 illustrates an example computationally-implemented method of operating a robotic vehicle configured to transport consumer items selected by a human shopper from a consumer shopping environment and placed in the robotic vehicle.

FIG. 10 illustrates an example computationally-implemented method of operating a robotic vehicle configured to transport consumer items selected by a human shopper from a consumer shopping environment and placed in the robotic vehicle. The method includes an operational flow 1000. After a start operation, the operational flow includes a distinguishing operation 1010 recognizing an individual human shopper placing a consumer item in the robotic vehicle. In an embodiment, the distinguishing operation may be implemented using the circuitry for recognizing 922 described in conjunction with FIG. 9. A following operation 1020 includes routing the robotic vehicle along a path following the recognized individual human shopper through the consumer shopping environment (hereafter "shopper-following movement"). In an embodiment, the following operation may be implemented using the circuitry for routing 924 described in conjunction with FIG. 9. An interruption operation 1030 includes suspending the shopper-following movement of the robotic vehicle in response to a suspension criteria. In an embodiment, the interruption operation may be implemented using the circuitry for suspending 926 described in conjunction with FIG. 9. A restart operation 1040 includes resuming the shopper-following movement of the robotic vehicle in response to a resumption criteria. In an embodiment, the restart operation may be implemented using the circuitry for resuming described in conjunction with FIG. 9. The operational flow includes an end operation.

In an embodiment, the operational flow 1000 includes receiving data indicative of a location of the individual human shopper in the consumer shopping environment; and routing the robotic vehicle to the location of the individual human shopper in the consumer shopping environment.

Figure 11:
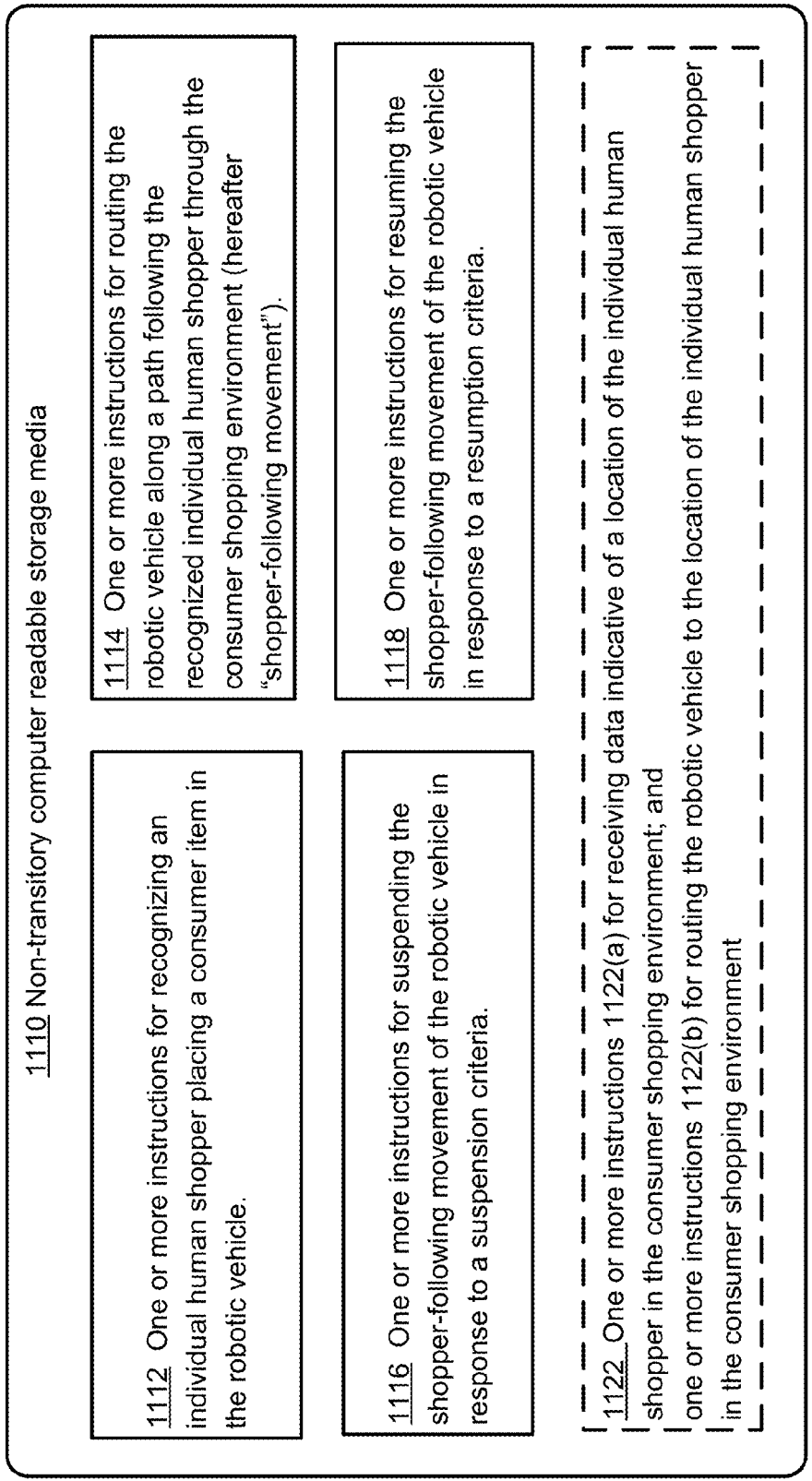
FIG. 11 illustrates an article of manufacture 1100 for operating a robotic vehicle configured to transport consumer items selected by a human shopper from a consumer shopping environment and placed in the robotic vehicle.

FIG. 11 illustrates an article of manufacture 1100 for operating a robotic vehicle configured to transport consumer items selected by a human shopper from a consumer shopping environment and placed in the robotic vehicle. The article of manufacture includes a non-transitory computer readable storage media 1110. The non-transitory computer readable storage media bears one or more instructions 1112 for recognizing an individual human shopper placing a consumer item in the robotic vehicle. The non-transitory computer readable storage media bears one or more instructions 1114 for routing the robotic vehicle along a path following the recognized individual human shopper through the consumer shopping environment (hereafter "shopper-following movement"). The non-transitory computer readable storage media bears one or more instructions 1116 for suspending the shopper-following movement of the robotic vehicle in response to a suspension criteria. The non-transitory computer readable storage media bears one or more instructions 1118 for resuming the shopper-following movement of the robotic vehicle in response to a resumption criteria.

In an embodiment, the non-transitory computer readable storage media 1110 bears one or more instructions 1122a for receiving data indicative of a location of the individual human shopper in the consumer shopping environment; and one or more instructions 1122b for routing the robotic vehicle to the location of the individual human shopper in the consumer shopping environment.

FIG. 12 illustrates an example system 1200 in the form of a machine, article of manufacture, or composition of matter for operating a robotic vehicle configured to transport consumer items selected by a human shopper from a consumer shopping environment and placed in the robotic vehicle. The system includes an identification module 1212 configured to recognize an individual human shopper placing a consumer item in the robotic vehicle. The system includes a guidance module 1214 configured to route the robotic vehicle along a path following the recognized individual human shopper through the consumer shopping environment (hereafter "shopper-following movement"). The system includes an interruption module 1216 configured to suspend the shopper-following movement of the robotic vehicle in response to a suspension criteria. The system includes a restart module 1218 configured to resume the shopper-following movement of the robotic vehicle in response to a resumption criteria.

In an embodiment, the system 1200 includes a receiver module 1222(a) configured to receive data indicative of a location of the individual human shopper in the consumer shopping environment; and a guidance module 1222(b) configured to route the robotic vehicle to the location of the individual human shopper in the consumer shopping environment.

FIGS. 1, 5, and 9 illustrate alternative embodiments of a robotic vehicle configured to transport consumer items 108 selected by a human shopper from a consumer shopping environment 102 and placed in the robotic vehicle. The robotic vehicle includes a package management system, alternative embodiments of which are illustrated by the package management system 120 described in conjunction with FIG. 1, the package management system 520 described in conjunction with FIG. 5, and the package management system 920 described in conjunction with FIG. 9. The robotic vehicle includes a body with a consumer item carrier, such as the secure portion 112, and the package security system 114. The robotic vehicle may also include at least one of a control system, a propulsion system configured to operate the robotic vehicle at a human walking speed, a steering device, or a guidance system. In an embodiment, the robotic vehicle may include a wheeled or tracked robotic vehicle. In an embodiment, the robotic vehicle may include the wireless communication device 163. In an embodiment, the robotic vehicle may include the sensor 174.

In an embodiment, the identity of consumer items 108 in the robotic vehicle 110 can be cataloged at a checkout. In an embodiment, the identity of consumer items in the robotic vehicle selected from at least two stores in the consumer shopping environment 102 can be separately cataloged or charged. In an embodiment, the identity of consumer items in the robotic vehicle can be treated separately before and after checkout (at N stores). In an embodiment, the robotic vehicle can independently go to a checkout lane when individual human shopper is done shopping, and then reacquire individual human shopper later. In an embodiment, the consumer shopping environment includes a dedicated robotic vehicle checkout lane. In an embodiment, the consumer shopping environment includes a checkout lane usable by the robotic vehicle and human shoppers. In an embodiment, the individual human shopper can pre-authorize a specified purchase limit. The robotic vehicle or a store in the consumer shopping environment can call the individual human shopper (or their software agent) for authorization when amount is determined at checkout.

In an embodiment, the robotic vehicle 110 is configured to take the individual human shopper's 195 selected consumer items 108 to a central facility for aggregation and/or temporary storage. In an embodiment, the individual human shopper can place selected consumer items in N different robotic vehicle at different points in their shopping (e.g., different stores in a mall), and have them all aggregated at central facility. In an embodiment, the robotic vehicle 110 can have N different isolated compartments, so N different people can place items in it before it returns to central facility.

In an embodiment, the robotic vehicle 110 is configured to offer deals or incentives to human shoppers using the robotic vehicle.

All references cited herein are hereby incorporated by reference in their entirety or to the extent their subject matter is not otherwise inconsistent herewith.

In some embodiments, "configured" includes at least one of designed, set up, shaped, implemented, constructed, or adapted for at least one of a particular purpose, application, or function.

It will be understood that, in general, terms used herein, and especially in the appended claims, are generally intended as "open" terms. For example, the term "including" should be interpreted as "including but not limited to." For example, the term "having" should be interpreted as "having at least." For example, the term "has" should be interpreted as "having at least." For example, the term "includes" should be interpreted as "includes but is not limited to," etc. It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

In those instances where a phrase such as "at least one of A, B, and C," "at least one of A, B, or C," or "an (item) selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Use of "Start," "End," "Stop," or the like blocks in the block diagrams is not intended to indicate a limitation on the beginning or end of any operations or functions in the diagram. Such flowcharts or diagrams may be incorporated into other flowcharts or diagrams where additional functions are performed before or after the functions shown in the diagrams of this application. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A package management system for operating a robotic vehicle configured to transport consumer items selected by a human shopper from a consumer shopping environment and placed by the human shopper in the robotic vehicle, the package management system comprising:
   circuitry for receiving data indicative of a transportation departure point accommodating a transfer of a consumer item from the robotic vehicle to a conveyance configured to transport the consumer item away from the consumer shopping environment, the consumer item selected by an individual human shopper and placed by the individual human shopper in the robotic vehicle; and
   circuitry for routing the robotic vehicle to the transportation departure point and determining an estimated arrival time of the robotic vehicle at the transportation departure point.

2. The package management system of claim 1, wherein the circuitry for receiving data includes circuitry for receiving data indicative of a surface transportation departure point.

3. The package management system of claim 1, wherein the circuitry for receiving data includes circuitry for receiving data indicative of a departure point selected by the individual human shopper.

4. The package management system of claim 1, wherein the circuitry for receiving data includes circuitry for receiving data indicative of a location of the transportation departure point from the individual human shopper.

5. The package management system of claim 4, wherein the circuitry for receiving data includes circuitry for receiving data indicative of a location of the transportation departure point from a wireless mobile device carried by the individual human shopper.

6. The package management system of claim 1, wherein the circuitry for receiving data includes circuitry for receiving data indicative of a particular conveyance at the transportation departure point designated by the individual human shopper.

7. The package management system of claim 1, wherein the circuitry for receiving data includes circuitry for (i) receiving data indicative of an attribute of a particular conveyance at the transportation departure point and (ii) determining the location of the particular conveyance at the transportation departure point at least partially based on the attribute of the particular conveyance.

8. The package management system of claim 1, wherein the circuitry for receiving data includes circuitry for (i) receiving data indicative of historical movements of the individual human shopper, and (ii) determining a location of the transportation departure point at least partially based on the historical movements of the individual human shopper.

9. The package management system of claim 1, wherein the circuitry for receiving data includes circuitry for receiving data indicative of an arrival time of the individual human shopper at the transportation departure point.

10. The package management system of claim 1, wherein the circuitry for receiving data includes circuitry for receiving a query regarding an estimated arrival time of the individual human shopper at the transportation departure point.

11. The package management system of claim 1, further comprising:
   circuitry for wirelessly transmitting data indicative of an estimated arrival time of the robotic vehicle.

12. The package management system of claim 1, further comprising:
   circuitry for managing a transfer of the consumer item from the robotic vehicle to the conveyance at the transportation departure point.

13. The package management system of claim 12, wherein the circuitry for managing a transfer further includes circuitry for managing a transfer of the consumer item from another robotic vehicle to the robotic vehicle.

14. The package management system of claim 12, wherein the circuitry for managing a transfer further includes circuitry for managing a transfer of the consumer item from a staging location to the robotic vehicle.

15. The package management system of claim 1, further comprising:
   circuitry for authorizing a release of the consumer item from a secure portion of the robotic vehicle, the consumer item further placed by the individual human shopper in the secure portion of the robotic vehicle.

16. The package management system of claim 15, wherein the circuitry for authorizing a release of the consumer item includes circuitry for authorizing in response to an authorization originated by the individual human shopper a release of the consumer item from the secure portion of the robotic vehicle.

17. The package management system of claim 15, wherein the circuitry for authorizing a release of the consumer item includes circuitry for authorizing in response to a recognition of the individual human shopper a release of the consumer item from the secure portion of the robotic vehicle.

18. The package management system of claim 15, wherein the circuitry for authorizing a release of the consumer item includes circuitry for authorizing in response to receipt of an authorization token a release of the consumer item from the secure portion of the robotic vehicle.

19. The package management system of claim 15, wherein the circuitry for authorizing a release of the consumer item includes circuitry for authorizing in response to a receipt of a payment for the consumer item a release of the consumer item from the secure portion of the robotic vehicle.

20. The package management system of claim 1, further comprising:
   circuitry for returning the robotic vehicle to a staging location after the consumer item is delivered to the transportation departure point.

21. A computationally-implemented method of operating a robotic vehicle configured to transport consumer items selected by a human shopper from a consumer shopping environment and placed by the human shopper in the robotic vehicle, the method comprising:
   receiving data indicative of a transportation departure point accommodating a transfer of a consumer item from the robotic vehicle to a conveyance configured to transport the consumer item away from the consumer shopping environment, the consumer item selected by an individual human shopper and placed by the individual human shopper in the robotic vehicle;
   routing the robotic vehicle to the transportation departure point; and
   returning the robotic vehicle to a staging location after the consumer item is released from the robotic vehicle at the transportation departure point.

22. The method of claim 21, further comprising:
   managing a transfer of the consumer item from another robotic vehicle to the robotic vehicle.

23. The method of claim 21, further comprising:
   authorizing a release of the consumer item 4 from a secure portion of the robotic vehicle, the consumer item further placed by the individual human shopper in the secure portion of the robotic vehicle.

24. An article of manufacture for operating a robotic vehicle configured to transport consumer items selected by a human shopper from a consumer shopping environment and placed by the human shopper in the robotic vehicle, the article of manufacture comprising:
   a non-transitory computer readable storage media bearing:
      one or more instructions for receiving data indicative of a transportation departure point accommodating a transfer of a consumer item from the robotic vehicle to a conveyance configured to transport the consumer item away from the consumer shopping environment, the consumer item selected by an individual human shopper and placed by the individual human shopper in the robotic vehicle;
      one or more instructions for routing the robotic vehicle to the transportation departure point; and
      one or more instructions for returning the robotic vehicle to a staging location after the consumer item is delivered to the transportation departure point.

25. The non-transitory computer readable storage media of the article of manufacture of claim 24, further includes:
   one or more instructions for managing a transfer of the consumer item from the another robotic vehicle to the robotic vehicle.

26. The non-transitory computer readable storage media of the article of manufacture of claim 24, further includes:
   one or more instructions for authorizing a release of the consumer item from a secure portion of the robotic vehicle, the consumer item further placed by the individual human shopper in the secure portion of the robotic vehicle.

27. A system in the form of a machine, article of manufacture, or composition of matter for operating a robotic vehicle configured to transport consumer items selected by a human shopper from a consumer shopping environment and placed by the human shopper in the robotic vehicle, the system comprising:
- a receiver module configured to receive data indicative of a transportation departure point accommodating a transfer of a consumer item from the robotic vehicle to a conveyance configured to transport the consumer item away from the consumer shopping environment, the consumer item selected by an individual human shopper and placed by the individual human shopper in the robotic vehicle;
- a guidance module configured to route the robotic vehicle to the transportation departure point; and
- a handover module configured to manage a transfer of the consumer item from another robotic vehicle to the robotic vehicle.

28. The system of claim 27, further comprising:
- a discharge module configured to release the consumer item from a secure portion of the robotic vehicle, the consumer item further placed by the individual human shopper in the secure portion of the robotic vehicle.

29. The system of claim 27, further comprising:
- a homing module configured to return the robotic vehicle to a staging location after the consumer item is delivered to the transportation departure point.

30. A package management system for operating a robotic vehicle configured to transport consumer items selected by a human shopper from a consumer shopping environment and placed by the human shopper in the robotic vehicle, the package management system comprising:
- circuitry for receiving data indicative of a transportation departure point accommodating a transfer of a consumer item from the robotic vehicle to a conveyance configured to transport the consumer item away from the consumer shopping environment, the consumer item selected by an individual human shopper and placed by the individual human shopper in the robotic vehicle;
- circuitry for routing the robotic vehicle to the transportation departure point; and
- circuitry for returning the robotic vehicle to a staging location after the consumer item is delivered to the transportation departure point.

* * * * *

UNITED STATES PATENT AND TRADEMARK OFFICE
CERTIFICATE OF CORRECTION

| | |
|---|---|
| PATENT NO. | : 9,921,583 B2 |
| APPLICATION NO. | : 15/046710 |
| DATED | : March 20, 2018 |
| INVENTOR(S) | : Alistair K. Chan et al. |

Page 1 of 1

It is certified that error appears in the above-identified patent and that said Letters Patent is hereby corrected as shown below:

Column 22, Line 30, Claim 23:
"the consumer item 4 from a secure"
Should read:
--the consumer item from a secure--

Signed and Sealed this
Third Day of July, 2018

Andrei Iancu
*Director of the United States Patent and Trademark Office*